(12) United States Patent
Muraoka et al.

(10) Patent No.: US 6,694,846 B2
(45) Date of Patent: Feb. 24, 2004

(54) BICYCLE PEDAL

(75) Inventors: Tsutomu Muraoka, Sakai (JP); Tomohiko Nishimura, Kaizuka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/084,439

(22) Filed: Feb. 28, 2002

(65) Prior Publication Data

US 2003/0159538 A1 Aug. 28, 2003

(51) Int. Cl.[7] .............................. G05G 1/14; A43B 5/00
(52) U.S. Cl. ........................ 74/594.6; 74/594.4; 36/131
(58) Field of Search ............................ 74/594.4, 594.6; 36/131, 132

(56) References Cited

U.S. PATENT DOCUMENTS

| 4,928,549 A | | 5/1990 | Nagano | |
|---|---|---|---|---|
| 5,060,537 A | * | 10/1991 | Nagano | 74/594.6 |
| 5,727,429 A | | 3/1998 | Ueda | |
| 5,755,144 A | * | 5/1998 | Ueda | 74/594.6 |
| 5,943,795 A | * | 8/1999 | Ueda et al. | 36/131 |
| D414,723 S | | 10/1999 | Hanamura | |
| 6,293,169 B1 | * | 9/2001 | Takahama | 74/594.6 |
| 6,305,244 B1 | * | 10/2001 | Takahama | 74/594.6 |

FOREIGN PATENT DOCUMENTS

| EP | 0542238 A1 | * | 5/1993 | 74/594.6 |
|---|---|---|---|---|
| FR | 2 442 175 A1 | | 6/1980 | |

OTHER PUBLICATIONS

2000 Bicycle Parts Catalogue; Title Unknown; 2 pages.

* cited by examiner

Primary Examiner—Vinh T. Luong
(74) Attorney, Agent, or Firm—Shinjyu Global Counselors, LLP

(57) ABSTRACT

A bicycle pedal assembly has a cleat releasably coupled to a pedal by a cleat engagement mechanism formed on an upper surface of its pedal body. The pedal body has a front end configured and arranged to include a sole guide portion that assists the rider in rotating the pedal body about its pedal shaft. In one embodiment, the sole guide portion is formed by a first concaved sole receiving recess located in a tip surface of the pedal body and a second concaved sole receiving recess located on the upper surface of the pedal body adjacent to the tip surface. Alternatively, the concaved sole receiving recesses can be replaced with either a pair of laterally spaced projections located on at the front end of the pedal body, or a V-shaped tip surface.

15 Claims, 17 Drawing Sheets

BICYCLE PEDAL

BACKGROUND OF THE INVENTION

1. Field of the Invention

This invention generally relates to a bicycle pedal assembly. More specifically, the present invention relates clipless or step-in bicycle pedal assembly, which has a rear float pivot axis for relative rotation of the cleat and pedal.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well as the frame of the bicycle. One component that has been extensively redesigned is the bicycle pedal.

In recent years, bicycle pedals have been designed for specific purposes such as for pleasure, off road biking, road racing, etc. One particular type of bicycle pedal, which is gaining more popularity, is the step-in or clipless pedal, which releasably engages a cleat secured to the sole of a cyclist's shoe. The clipless pedal has a pedal spindle that can be mounted on the crank of a bicycle, a pedal body that is rotatably supported on this pedal spindle, and a cleat engagement mechanism. In an off road bicycle pedal a cleat engagement mechanism is formed on both sides of the pedal body for engaging a cleat. A road-racing pedal, on the other hand, typically only has a cleat engagement mechanism on one side of the pedal body. In either case, in these types of bicycle pedals, the rider steps onto the pedal and the cleat engagement mechanism automatically grips on to the cleat secured to the bottom of the cyclist's shoe.

With this type of step-in or clipless pedal, the shoe and the pedal are in a state of constant engagement when the cleat is engaged in the cleat clamping members, so the pedaling force can be transmitted efficiently to the pedals. As a result, step-in or clipless pedals are widely employed on racing bicycles used in road racing and mountain bike racing.

When attaching the cyclist's shoe to the step-in or clipless pedal via the cleat, the cyclist moves the shoe obliquely downwardly and forwardly relative to the pedal body such that the front end of the cleat engages a front hook or clamping member of the pedal body. Once the front end of the cleat is engaged with the front hook of the pedal body, the cyclist places the rear end of the cleat in contact with a guide portion of the rear hook or clamping member of the pedal body. In this position, the cyclist presses the shoe downwardly against the pedal to cause the rear hook or clamping member to initially pivot rearwardly against the force of a spring to move the rear hook or clamping member to a cleat releasing position. The rear end of the cleat then enters a position opposite a back face of the rear hook or clamping member. Then, the rear hook or clamping member returns under the force of a biasing member or spring so that the rear hook or clamping member engages the rear end of the cleat. This engagement fixes the cyclist's shoe to the pedal via the cleat.

However, these step-in or clipless pedals can be complicated and expensive to manufacture and assemble. Additionally, these step-in or clipless pedals can become clogged with mud and or debris making engagement/disengagement difficult. Moreover, some of these step-in or clipless pedal sometimes do not transfer power to the bicycle crank arms in the most efficient manner. Finally, these step-in or clipless pedal can be uncomfortable and cause fatigue to the riders' foot after extended riding periods.

In view of the above, there exists a need for a bicycle pedal assembly which overcomes the above mentioned problems in the prior art. This invention addresses this need in the prior art as well as other needs, which will become apparent to those skilled in the art from this disclosure.

SUMMARY OF THE INVENTION

One object of the present invention is to provide a step-in bicycle pedal assembly that is relatively easy to step into and engage the cleat.

Another object of the present invention is to provide a step-in bicycle pedal assembly that is relatively simple and inexpensive to manufacture.

Another object of the present invention is to provide a step-in bicycle pedal assembly that is relatively lightweight and malfunction free.

Still another object of the present invention is to provide a step-in bicycle pedal assembly that is relatively easy to assemble and disassemble.

The foregoing objects can basically be achieved by providing a bicycle pedal assembly comprising a pedal shaft, a pedal body and a cleat engagement mechanism. The pedal shaft has a first end adapted to be coupled to a bicycle crank and a second end with a center rotation axis extending between the first and second ends. The pedal body is rotatably coupled to the second end of the pedal shaft about the center rotation axis of said pedal shaft. The pedal body has a front end and a rear end with the front end of the pedal body being configured and arranged to include a sole guide portion that assists in rotating the pedal body about the pedal shaft. The cleat engagement mechanism is coupled to an upper surface of the pedal body and arranged to move between a clamping position and a release position.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
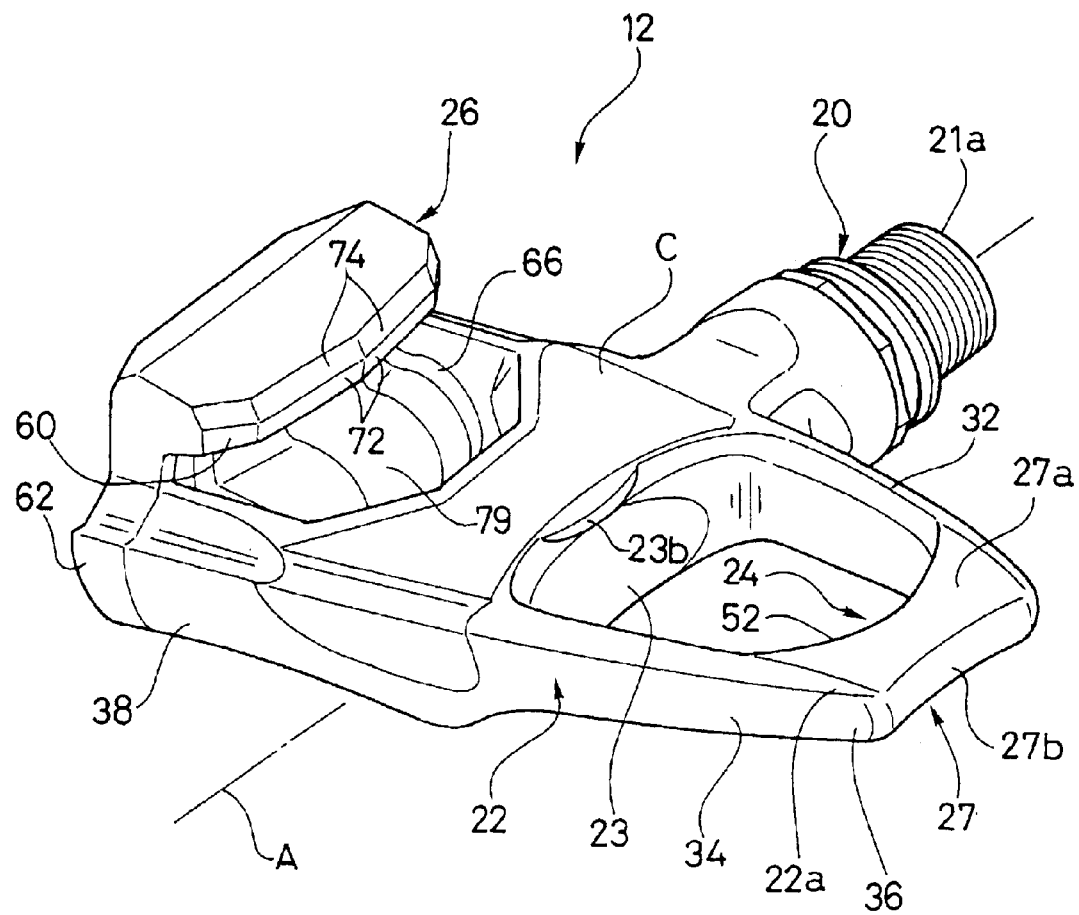
FIG. 1 is a front perspective view of a bicycle pedal in accordance with a preferred embodiment of the present invention.
Figure 2:
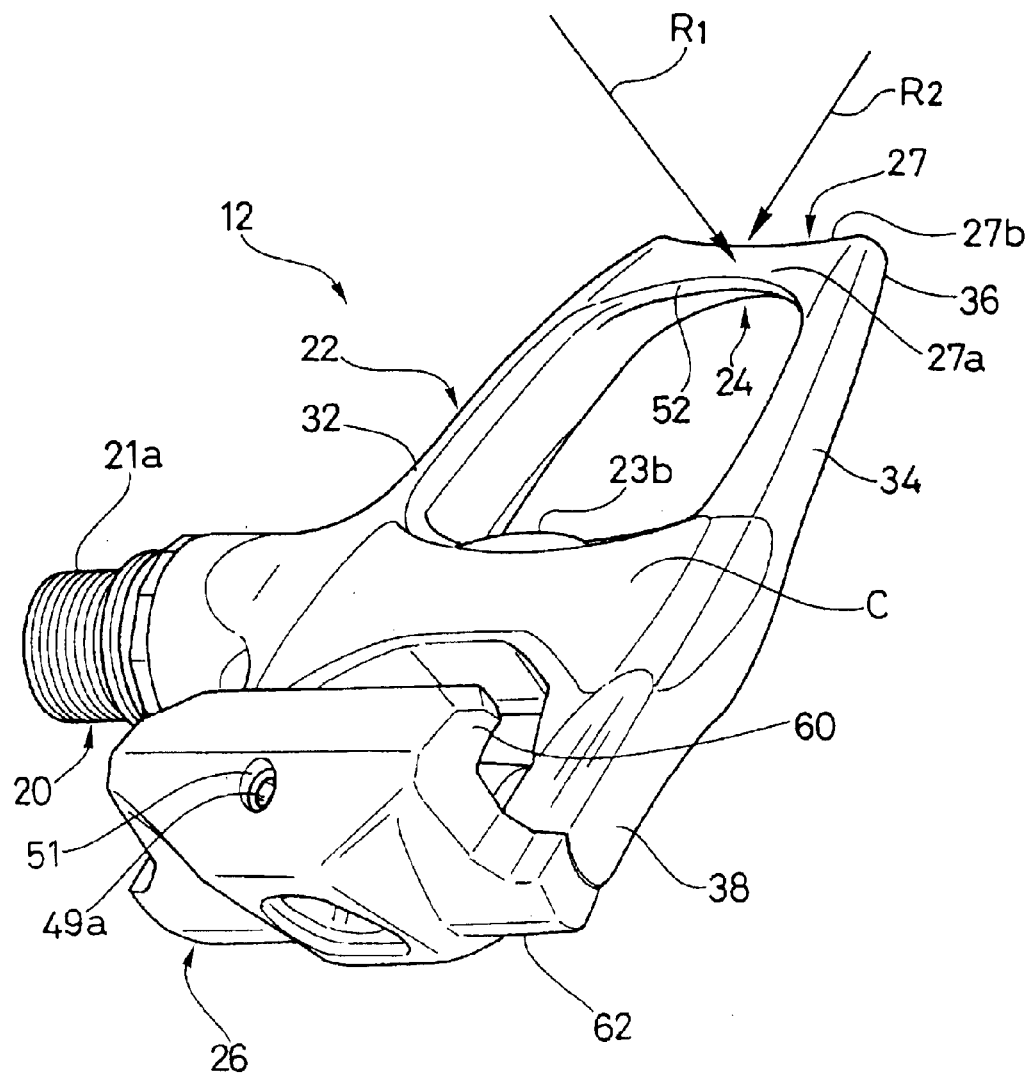
FIG. 2 is a rear perspective view of the bicycle pedal illustrated in FIG. 1.
Figure 3:
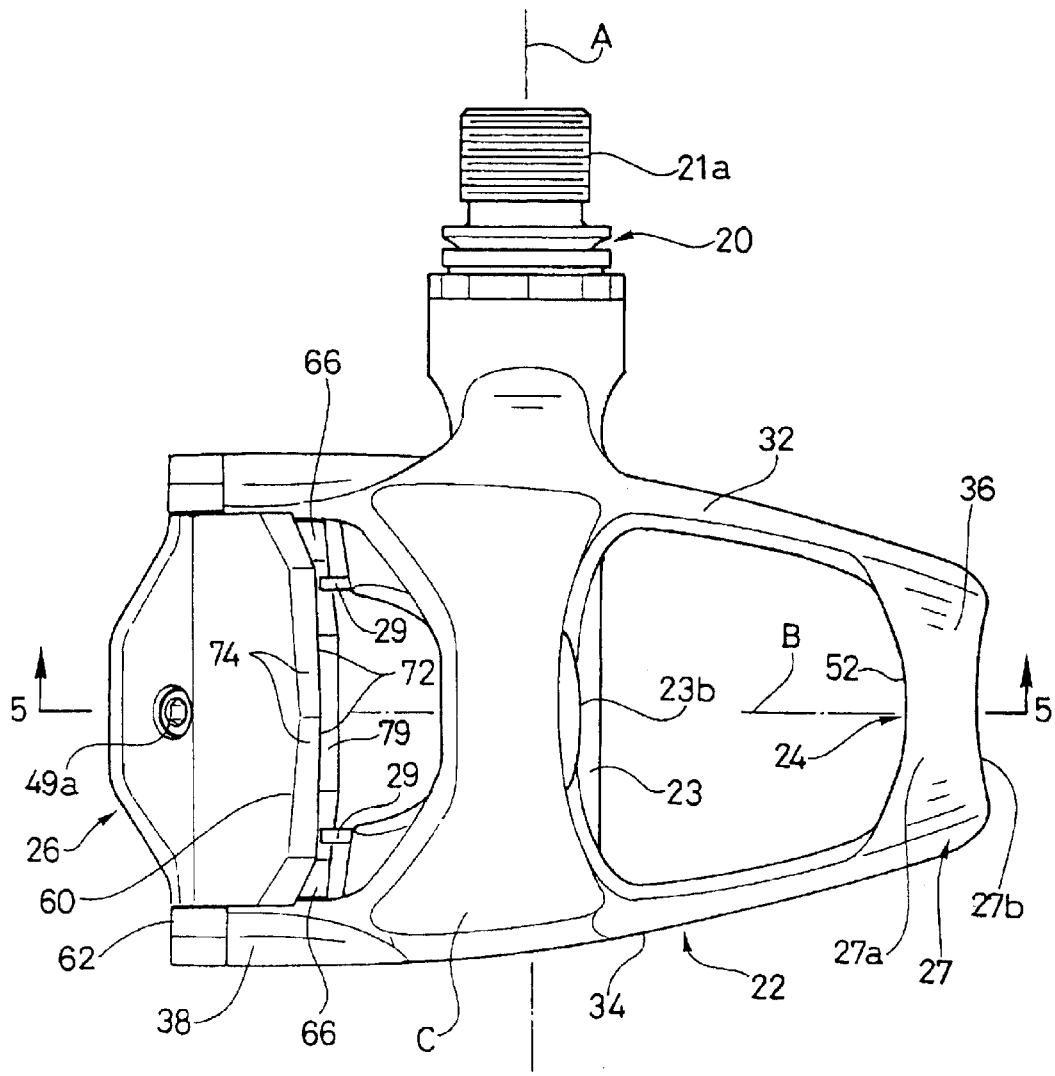
FIG. 3 is a top plan view of the bicycle pedal illustrated in FIGS. 1 and 2.
Figure 4:
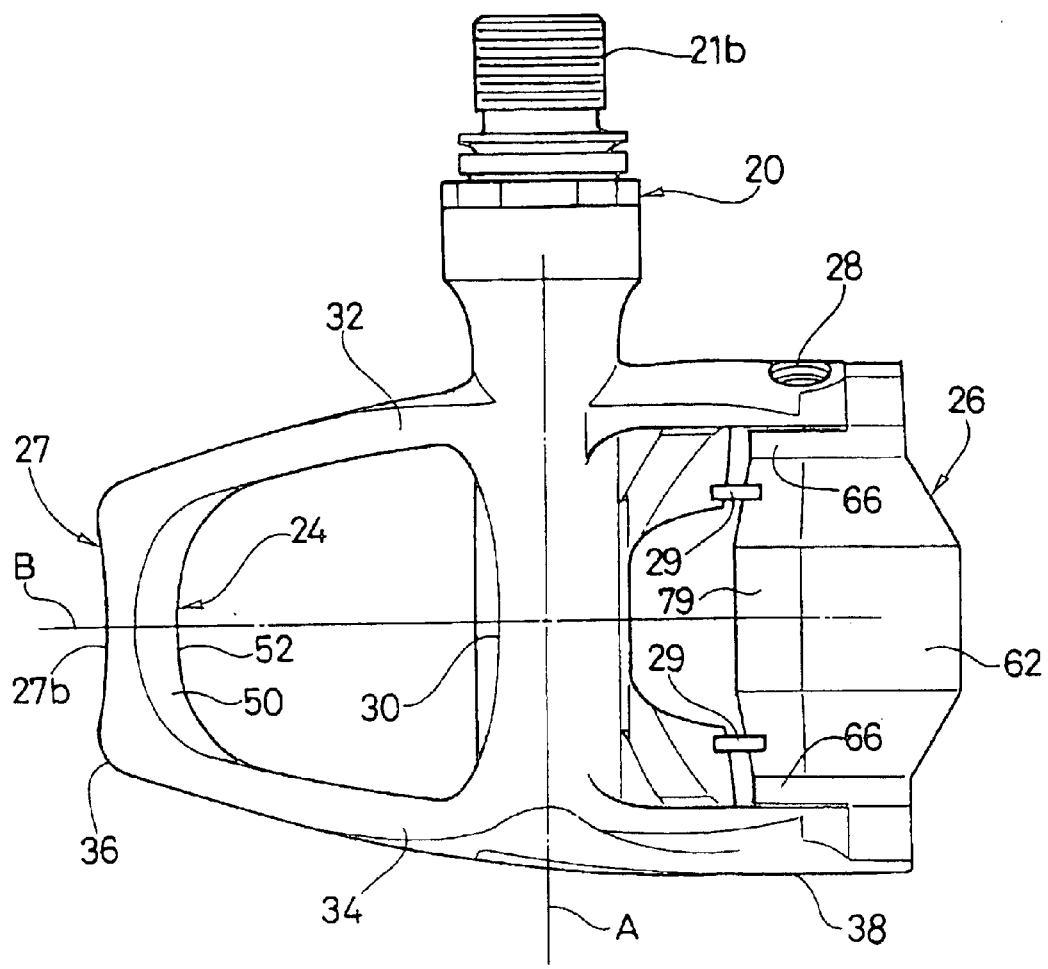
FIG. 4 is a bottom plan view of the bicycle pedal illustrated in FIGS. 1–3.

Referring initially to FIGS. 1–3, a bicycle pedal 12 is illustrated in accordance with the first embodiment of the present invention. The bicycle pedal 12 is a clipless or step-in pedal that selectively and releasably receives a cleat 14 as seen in FIGS. 16–26. The bicycle pedal 12 and the cleat 14 form part of a bicycle pedal assembly 10. The cleat 14 is preferably fixedly coupled to a bicycle shoe 16 to releasably couple the cyclist's foot to the bicycle pedal 12. The bicycle pedal 12 is also designed to be relatively simple and inexpensive to manufacture and assemble.

The bicycle pedal assembly 10 is especially designed for use with road bicycles as opposed to use with an off-road bicycle. However, it will be apparent to those skilled in the art from this disclosure that the features of the bicycle pedal assembly 10 can be used in the construction of an off-road type of bicycle pedal assembly if needed and/or desired. In other words, it will be apparent that while the pedal 12 has one side designed to have the cleat 14 coupled thereto, that the principles of the present invention could be applied to a two-sided pedal.

As explained below, the pedal 12 and the cleat 14 are configured and arranged to prevent inadvertent release of the cleat 14 from the pedal 12 due to relative rearward movement of the cleat 14 relative to the pedal 12.

The bicycle pedal assembly 10 is especially designed for use with road bicycles as opposed to use with an off-road bicycle. However, it will be apparent to those skilled in the art from this disclosure that the features of the bicycle pedal assembly 10 can be used in the construction of an off-road type of bicycle pedal assembly if needed and/or desired. In other words, it will be apparent that while the pedal 12 has one side designed to have the cleat 14 coupled thereto, that the principles of the present invention could be applied to a two-sided pedal.

Figure 16:
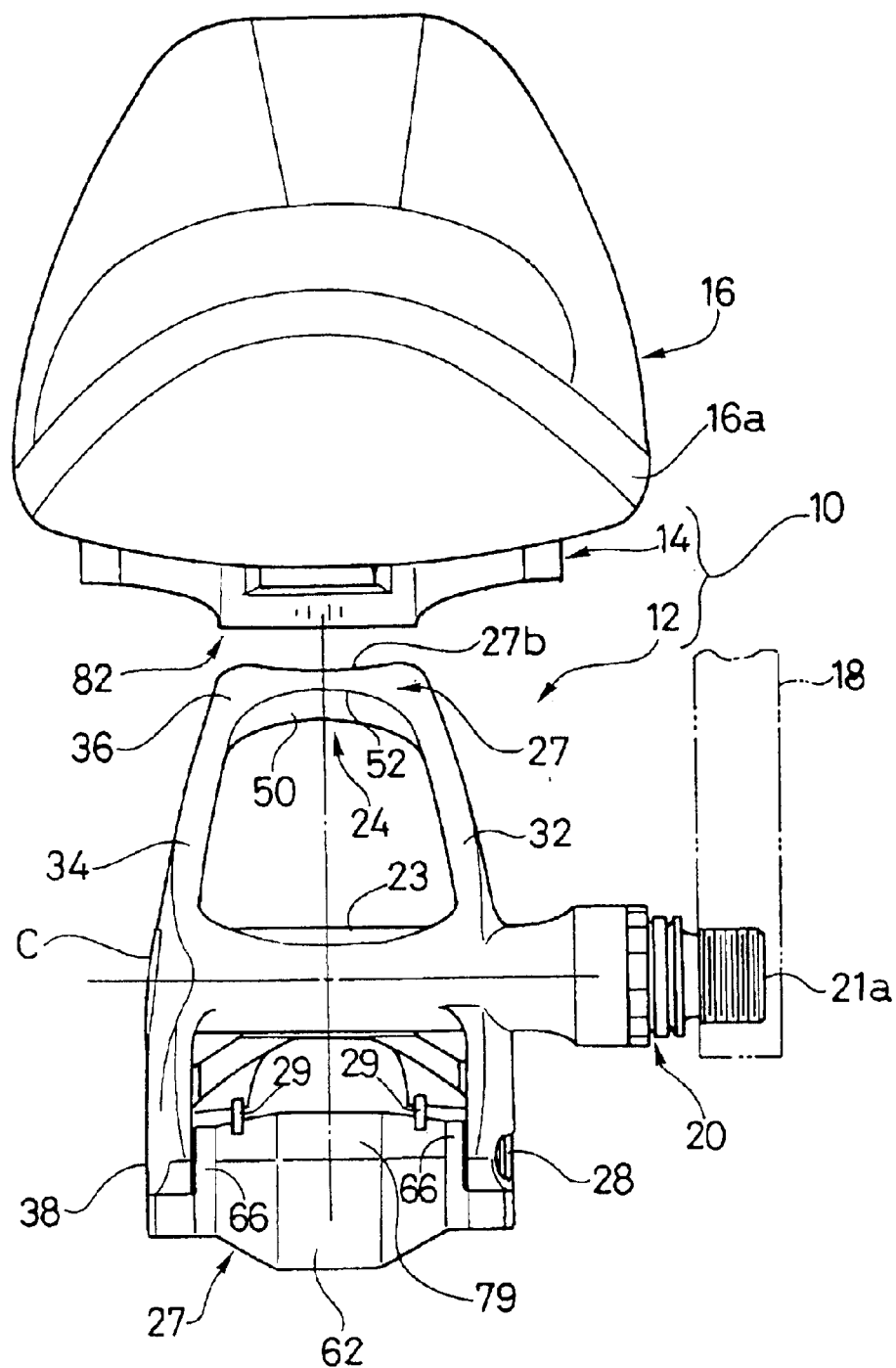
FIG. 16 is a front elevational view of the bicycle pedal illustrated in FIGS. 1–5 just prior to contact with a bicycle shoe having the cleat illustrated in FIGS. 11–15 coupled thereto.
Figure 17:
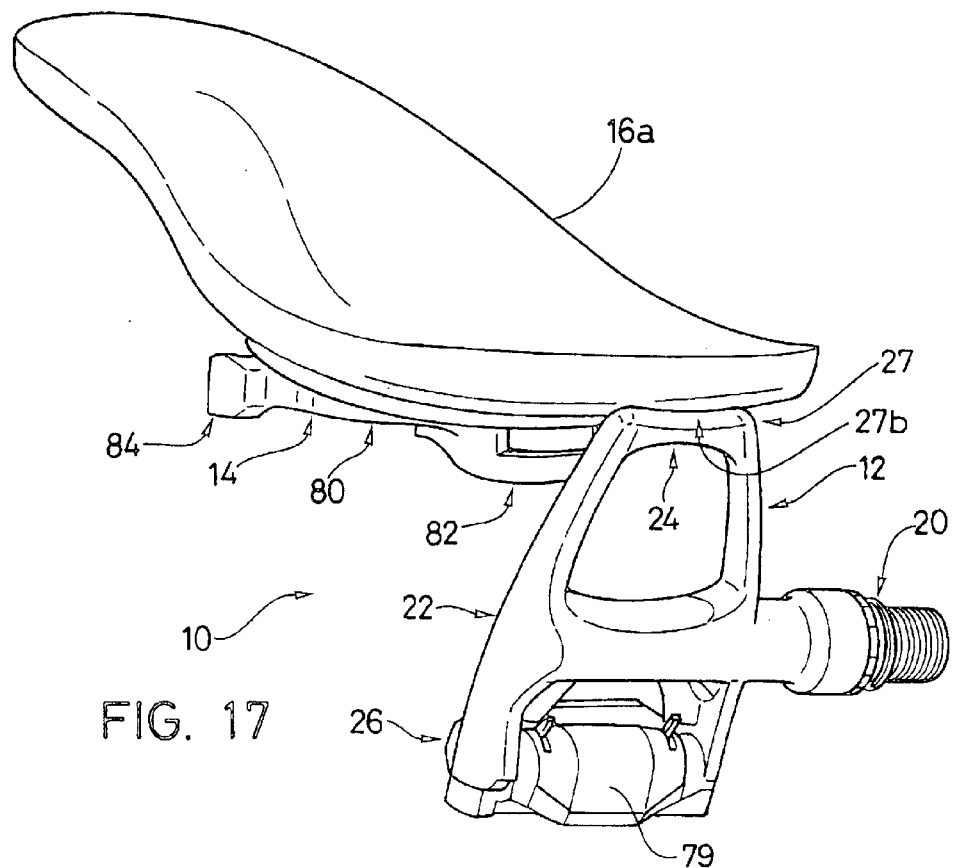
FIG. 17 is a front perspective view of the bicycle pedal illustrated in FIGS. 1–5, just after initial contact with the shoe portion of the bicycle shoe.
Figure 18:
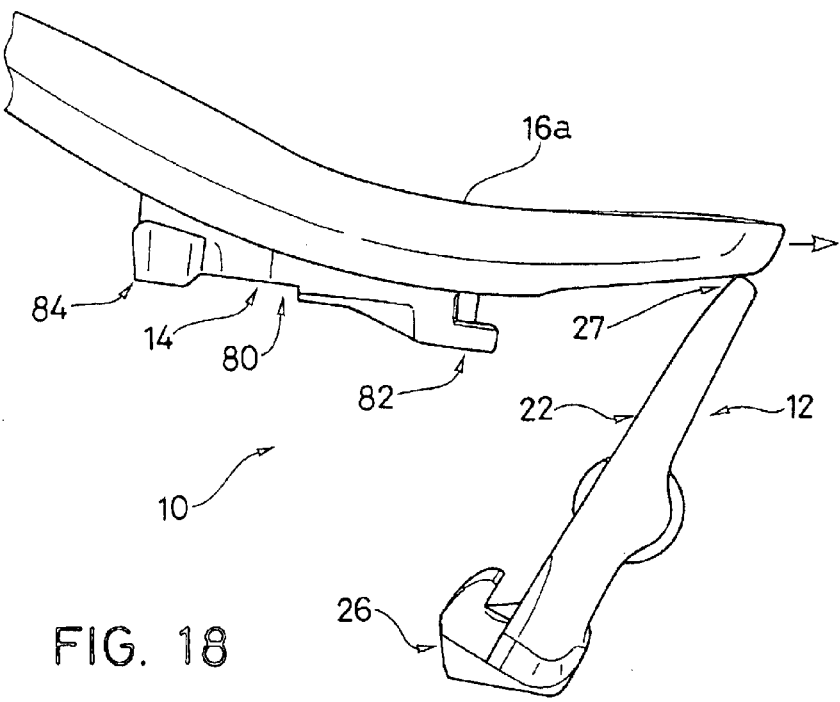
FIG. 18 is a partial side elevational view, similar to FIG. 17, of the bicycle pedal illustrated in FIGS. 1–5, just after initial contact with the shoe portion of the bicycle shoe.
Figure 19:
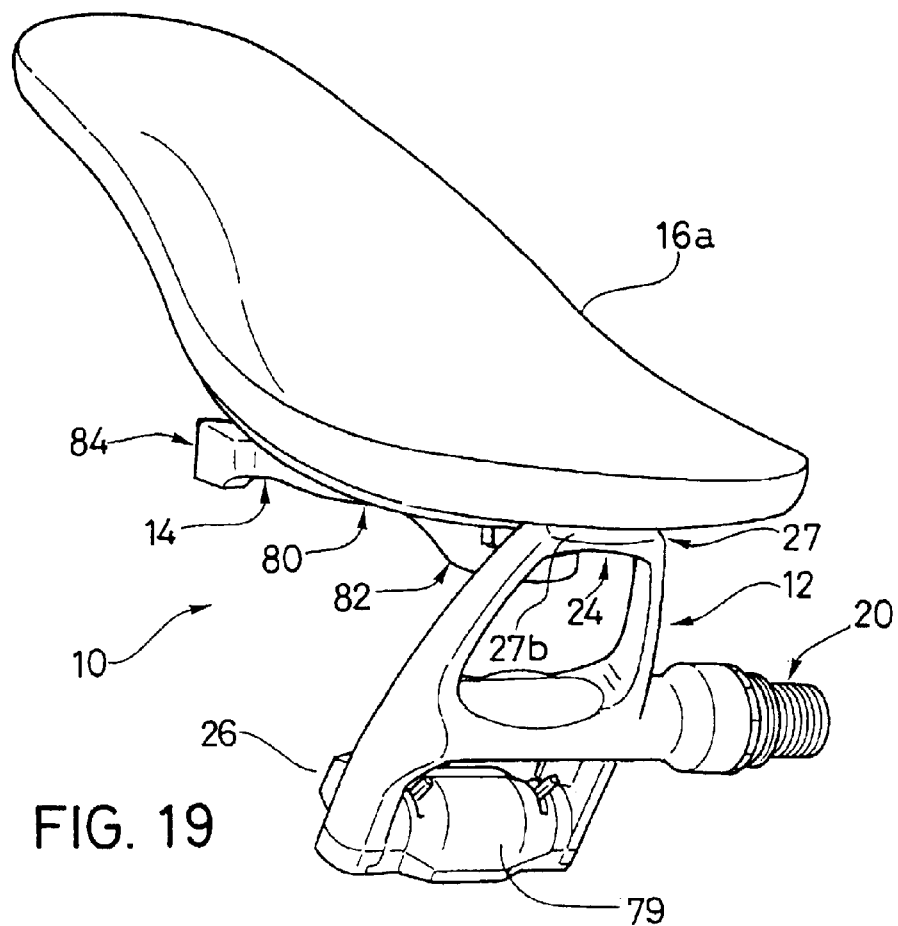
FIG. 19 is a front perspective view of the bicycle pedal illustrated in FIGS. 1–5, after sliding contact between the shoe portion of the bicycle shoe and the front end of the bicycle pedal.
Figure 20:
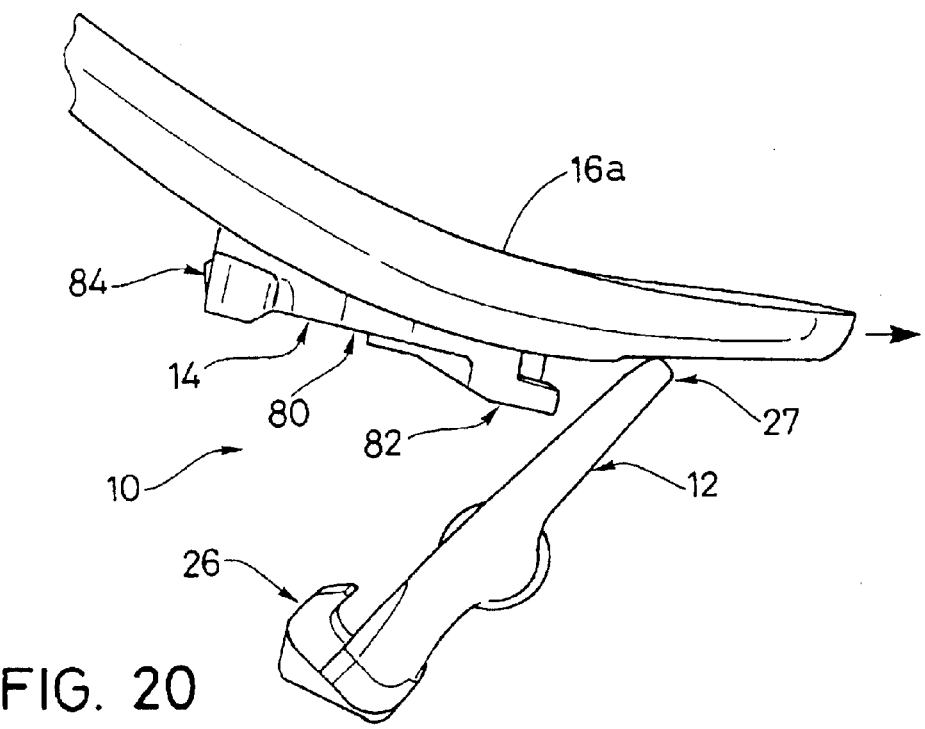
FIG. 20 is a partial side elevational view, similar to FIG. 19, of the bicycle pedal illustrated in FIGS. 1–5, after sliding contact between the shoe portion of the bicycle shoe and the front end of the bicycle pedal.
Figure 21:
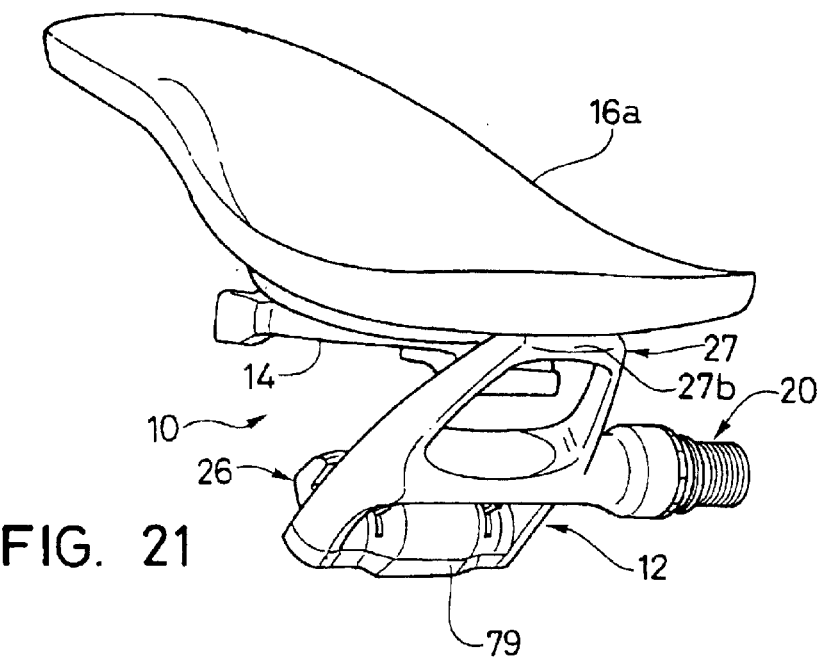
FIG. 21 is a front perspective view of the bicycle pedal illustrated in FIGS. 1–5, just after contact between the cleat and the front end of the bicycle pedal.
Figure 22:
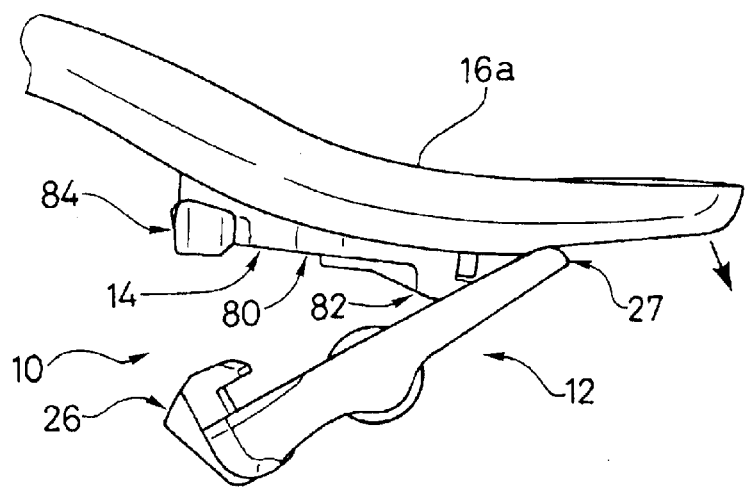
FIG. 22 is a partial side elevational view, similar to FIG. 21, of the bicycle pedal illustrated in FIGS. 1–5, just after contact between the rear attachment portion of the cleat and the rear clamping member of the bicycle pedal.
Figure 23:
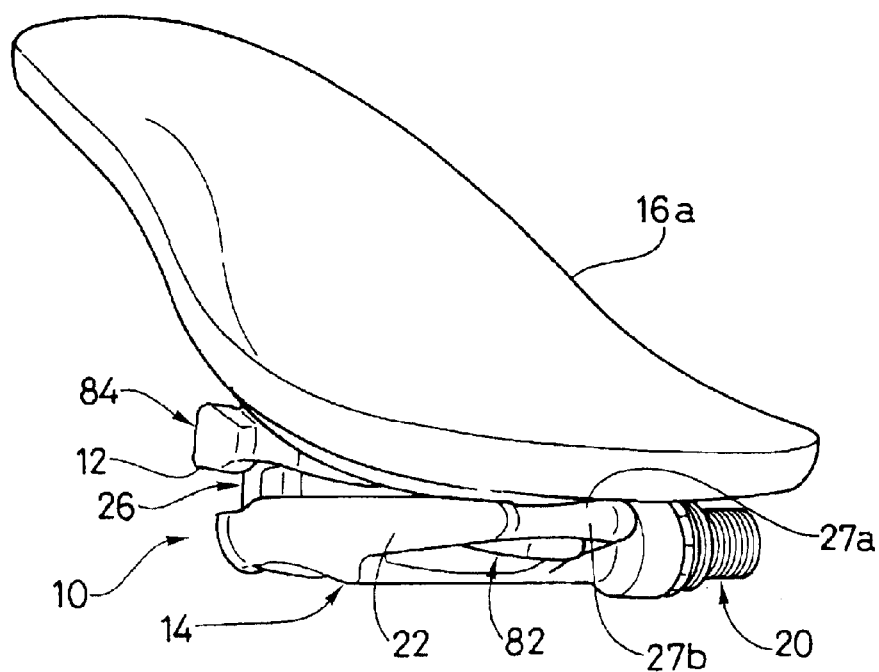
FIG. 23 is a front perspective view of the bicycle pedal illustrated in FIGS. 1–5, just after contact between the rear attachment portion of the cleat and the rear clamping member of the bicycle pedal.
Figure 24:
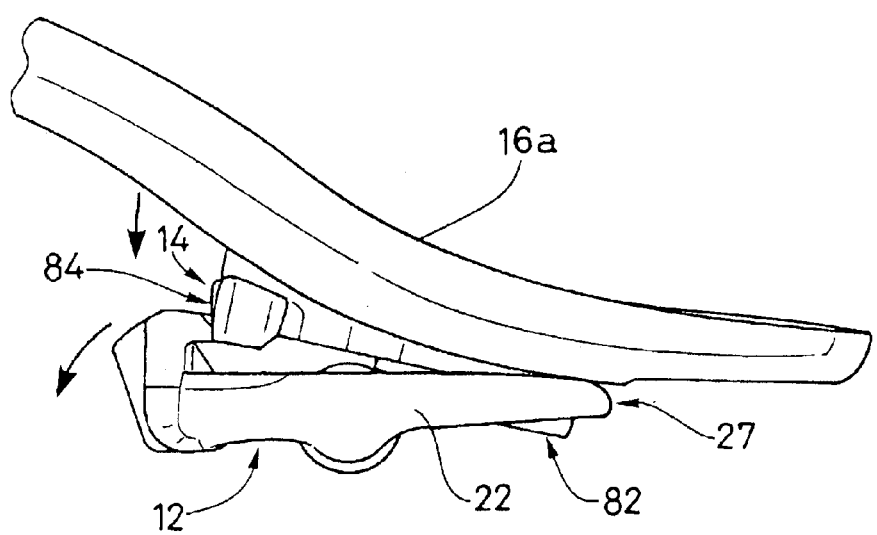
FIG. 24 is a partial side elevational view, similar to FIG. 23, of the bicycle pedal illustrated in FIGS. 1–5, just after contact between the rear attachment portion of the cleat and the rear clamping member of the bicycle pedal.
Figure 25:
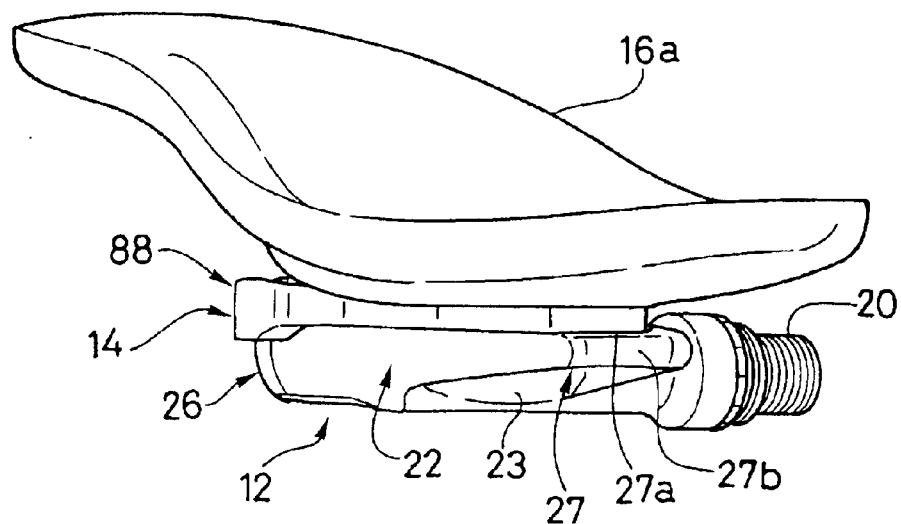
FIG. 25 is a front perspective view of the bicycle pedal illustrated in FIGS. 1–5, after full engagement between the rear attachment portion of the cleat and the rear clamping member of the bicycle pedal.
Figure 26:
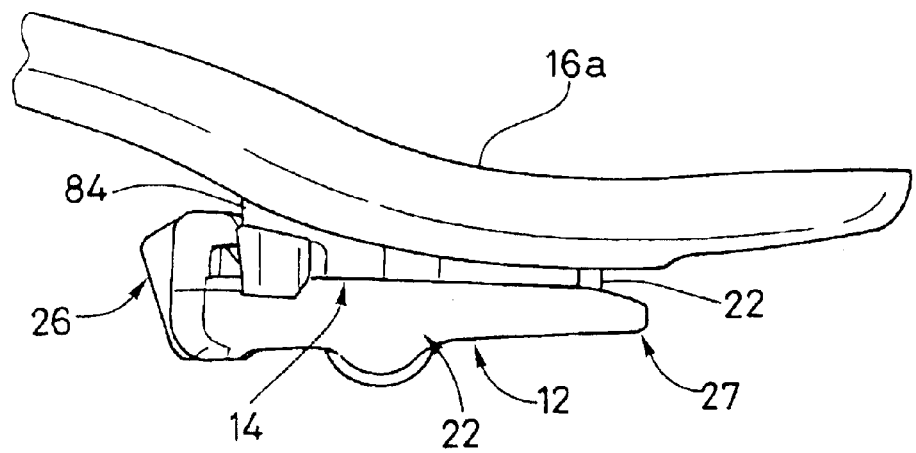
FIG. 26 is a partial side elevational view, similar to FIG. 25, of the bicycle pedal illustrated in FIGS. 1–5, after full engagement between the rear attachment portion of the cleat and the rear clamping member of the bicycle pedal.

The bicycle pedal 12 is fixedly coupled to a bicycle crank arm 18 of a bicycle (not shown) for rotation therewith, as seen in FIG. 16. The bicycle pedal 12 illustrated is a right side pedal. Of course, the right side pedal 12 is the mirror image of the left side pedal (not shown). Thus, it will be apparent to those skilled in the art that the description of the right side pedal 12 also applies to a left side pedal.

As seen in FIGS. 1–5, the bicycle pedal 12 basically includes a pedal shaft or spindle 20, a pedal body 22 with a center tubular shaft supporting portion 23, a front (first) clamping member 24 and a rear (second) clamping member 26. Optionally, the bicycle pedal has a pad C overlying the upper central section of the pedal body 22. Preferably, a portion of the pad C extends along the outer side of the pedal body 22. The pad C is preferably fixedly secured in recesses formed in the pedal body 22 by a friction fit and/or adhesive.

The front and rear clamping members 24 and 26 are preferably fixedly coupled to the pedal body 22, with the front clamping member 24 being fixed to the pedal body 22 and the rear clamping member 26 being pivotally coupled to the pedal body 22. The front and rear clamping members 24 and 26 define a cleat engagement mechanism that is coupled to an upper surface of the pedal body 22 and arranged to move between a clamping position and a release position.

The front end of the pedal body 22 is configured and arranged to include a sole guide portion 27 that assists in rotating the pedal body 22 about the pedal shaft 20. The sole guide portion 27 includes a first concaved sole receiving recess 27a located on the upper surface 22a of the pedal body 22 and a second concaved sole receiving recess 27b located in a forwardly facing tip surface 22b of the pedal body 22. The concaved sole receiving recess 27a is located adjacent the forwardly facing tip surface 22b of the pedal body 22. In the illustrated embodiment, the first concaved sole receiving recess 27a has a radius of curvature $R_1$ of approximately 64.0 millimeters, while the second concaved sole receiving recess 27b has a radius of curvature $R_2$ of approximately 59.4 millimeters.

As seen in FIGS. 16–26, the first and second concaved sole receiving recesses 27a and 27b cooperate with a front sole portion 16a of the bicycle shoe 16 and the tip of the cleat 14 to assists in rotating the pedal body 22 about the pedal shaft 20 during the engagement process of the cleat 14 with the pedal 12.

The shaft 20 is adapted to be coupled to the crank arm 18, while the pedal body 22 is rotatably coupled to the shaft 20 for supporting a cyclist's foot. Specifically, the pedal shaft 20 has a first end 21a that is fastened to the crank arm 18 (FIG. 16) and a second end 21b (FIG. 5) rotatably supported in the tubular shaft supporting portion 23 of the pedal body 22. A center longitudinal axis A extends between the first and second ends 21a and 21b of the pedal shaft 20. The pedal body 22 is freely rotatable about the center longitudinal axis A. A cleat receiving area is formed on one side of the pedal body 22 for receiving and supporting the cleat 14 thereon. More specifically, the cleat receiving area is defined as the space located between the front and rear clamping members 24 and 26.

The pedal shaft 20 is preferably a multi-step spindle having several stepped portions that are rotatably coupled within a hollow area of the pedal body 22 in a conventional manner. The first end 21a of the pedal shaft 20 has threads formed thereon for fixedly coupling the pedal 12 to the crank arm 18 in a conventional manner. Preferably, the threads of the right pedal 12 are preferably clockwise threads such that the right pedal 12 remains coupled to the crank arm 18 in a conventional manner. Alternatively, the threads of the left pedal shaft (not shown) are preferably counter-clockwise threads such that the left pedal remains coupled to an opposing crank arm (not shown) in a conventional manner. The second end 21b of the pedal shaft 20 rotatably supports the pedal body 22 about the longitudinal axis A by a conventional bearing assembly (not shown).

In particular, the pedal shaft 20 is secured within the hollow area of the tubular shaft supporting portion 23 of the pedal body 22 by an inner tube and a lock nut in a conventional manner. More specifically, the pedal shaft 20 has the lock nut mounted thereon to secure a bearing assembly and the pedal shaft 20 within the hollow area of the pedal body 22. Since these parts are relatively conventional parts and the specific constructions of these parts are not critical to the present invention, they will not be discussed or illustrated in detail herein. Rather, these parts will only be discussed as necessary to understand the present invention.

The tubular shaft supporting portion 23 of the pedal body 22 has an upper cleat supporting surface 23a and a forwardly facing (first) cleat stop surface 23b. The upper cleat supporting surface 23a lies in a generally flat plane that faces upwardly from the pedal body for supporting the cleat 14. More specifically, the upper cleat supporting surface 23a cooperates with the front and rear clamping members 24 and 26 to limit movement of the cleat 14 in a direction substantially perpendicular to the upper cleat supporting surface 23a. The cleat stop surface 23b is disposed on a forwardly facing portion of the tubular shaft supporting portion 23 of the pedal body 22. The cleat stop surface 23b is a convexly curved surface that faces towards the front clamping member 24. The curvature of the cleat stop surface 23b is preferably bisected by the longitudinal axis B of the pedal body 22. In other words, the longitudinal axis B of the pedal body 22 bisects the cleat stop surface 23b.

The front clamping member 24 is fixedly coupled to the pedal body 22, while the rear clamping member 26 is pivotally coupled to the pedal body 22. More specifically, the front clamping member 24 is preferably a non-movable member that is integrally formed with the pedal body 22, while the rear clamping member 26 is preferably a separate member mounted on a pivot pin or support pin 28. The pivot pin 28 is coupled to the pedal body 22. Two torsion springs 29 are preferably coupled between the pedal body 22 and the rear clamping member 26. While two springs 29 are preferably mounted on the pivot pin 28, it will be apparent to those skilled in the art from this disclosure that fewer or more springs can be used. Moreover, it will be apparent to those skilled in the art the other types of urging member(s)/resilient member(s) could be utilized to carry out the present invention. Accordingly, the term "biasing member" as used herein refers to one or more members that applies an urging force between two elements.

Referring to FIGS. 16–26, the cleat 14 is fixedly attached to the bicycle shoe 16 in a conventional manner via fasteners. The cleat 14 is releasably engaged to the pedal body 22 via the clamping members 24 and 26 in a relatively conventional manner. In other words, the cleat 14 is designed to releasably couple the sole of the shoe 16 to the bicycle pedal 12 by the front and rear clamping members 24 and 26. This type of pedal is often called a step-in or clipless pedal. Specifically, the cleat 14 is engaged with the pedal 12 by pressing the cleat 14 into the pedal 12 with a forward and downward motion. This releasably locks the cleat 14 to the pedal 12. The cleat 14 can be released from pedal 12 by twisting the heel of the shoe to the outside of the pedal 12 as discussed below in more detail. However, the shoe 16 is capable of limited rotation or float about a rear float pivot axis prior to disengagement.

As shown in FIGS. 1–5, the pedal body 22 has an inner (first) side portion 32 and an outer (second) side portion 34 with the tubular shaft supporting portion 23 extending transversely therebetween. The tubular shaft supporting portion 23 receives the pedal shaft 20 for rotation about the center longitudinal axis A, while rear ends of the side portions 32 and 34 pivotally support the rear clamping member 26. The side portions 32 and 34 are coupled together at the front of the pedal body 22 (in a substantially U-shape) to form the front clamping member 24 as an integral part of the pedal body 22. The parts of the pedal body 22 are preferably made of a lightweight rigid metallic material such as an aluminum alloy. One of the clamping members 24 and 26 is located at each end of pedal body 22. In particular, the pedal body 22 is an A-shaped member with a first (front) closed end 36 and a second (rear) open end 38. The front clamping member 24 is coupled at the front end 36, while the rear clamping member 26 is coupled to the rear end 38. The rear clamping member 26 pivotally coupled between the side portions 32 and 34 via the pivot pin 28.

The tubular shaft supporting portion 23 is preferably integrally formed with the first and second side portions 32 and 34 as a one-piece, unitary member. Moreover, the front clamping member 24 is also preferably integrally formed with the pedal body 22. Of course, it will be apparent to those skilled in the art from this disclosure that other constructions could be utilized if needed and/or desired. For example, the pedal body could be formed of several separate pieces removably secured together by a plurality of screws or other conventional fasteners. Furthermore, it will be apparent to those skilled in the art that the front clamping member 24 could be a separate member that is releasably coupled to a one-piece H-shaped pedal body if needed and/or desired. In any event, the front clamping member 24 is preferably fixedly and non-movably coupled to the pedal body 22.

The side portions 32 and 34 extend forward and backward from the tubular shaft supporting portion 23 such that the clamping members 24 and 26 are located at opposite ends thereof. The first side portion 32 has a threaded through bore 40 (at the rear end 38 of pedal body 22) for receiving support pin 28 therein. The threaded bore 40 aids in providing an attractive appearance, since the end or head of pin 28 is not visible from the outside of the pedal body 22. The second (outer) side portion 34 is provided with an unthreaded blind bore 44 aligned with threaded bore 40 for receiving the outer end of the pivot pin 28. The bores 40 and 44 are configured to secure the pivot pin 28 therein in an aesthetic and reliable manner. Thus, a smooth outer surface can be formed.

An enlarged central blind bore 43 extends through the tubular shaft supporting portion 23 and the side portion 32 for rotatably receiving the shaft 20 therein (i.e. to form the hollow area).

As mentioned above, the front clamping member 24 is preferably integrally formed with the pedal body 22. Thus, the front clamping member 24 is preferably formed of lightweight rigid metallic material such as aluminum alloy. The front clamping member 24 basically includes a front cleat engagement surface 50 and a front pedal control surface 52, as seen in FIGS. 5–8. The front cleat engagement surface 50 is a substantially C-shaped flat surface that faces in a downward (first) direction when the pedal 12 is in the normal riding position. The front cleat engagement surface 50 lies in a first plane $P_1$. The front pedal control surface 52 is a transverse surface extending upwardly from the rear edge of the front cleat engagement surface 50.

More specifically, the front pedal control surface 52 is preferably arranged substantially perpendicular to the front cleat engagement surface 50. The front pedal control surface 52 is formed of a concave curved center surface with a radius of curvature of about 26.6 millimeters.

The front clamping member 24 also preferably includes a transverse abutment surface 54 extending downwardly from the front cleat engagement surface 50. The abutment surface 54 is substantially perpendicular to the front cleat engagement surface 50.

The rear clamping member 26 has a roughly U-shaped configuration, with its two ends being pivotally supported by the support pin 28 that passes between the side portions 32 and 34 of the pedal body 22. The rear clamping member 26 basically includes a rear clamping portion 60 and a mounting portion 62 with a pair of mounting flanges 66 extend therefrom to mount the rear clamping member 26 on the support pin 28. Specifically, each mounting flange 66 has a through bore formed therein for receiving the support pin 28. The mounting portion 62 has a centrally located stepped bore formed therein for receiving part of a tension adjustment mechanism.

The rear clamping portion 60 of the rear clamping member 26 basically includes a rear cleat engagement surface 70, a pair of rear pedal control surfaces 72 and a pair of inclined guide surfaces 74. The rear pedal control surfaces 72 basically converge to a center point that defines a rear pedal pivot surface. The rear pedal pivot surface or point defined by the convergence of the rear pedal control surfaces 72 forms an effective curvature that cooperates with the cleat 14 to form the rear floating pivot axis.

The rear cleat engagement surface 70 is a flat surface that faces in the same direction (i.e. the first downward direction) as the front cleat engagement surface 50. The rear cleat engagement surface 70 lies in a second plane $P_2$ that is offset from the first plane $P_1$. More specifically, the second plane $P_2$ is preferably located above the first plane $P_1$ when the pedal 12 is in the normal riding position. Preferably, the front and rear cleat engagement surfaces 50 and 70 are parallel to each other.

The rear pedal control surfaces 72 are transverse surfaces extending upwardly from the rear cleat engagement surface 70. The rear pedal control surfaces 72 are preferably substantially perpendicular to the rear cleat engagement surface 70.

The inclined guide surfaces 74 preferably has an extending upwardly away from the transverse rear pedal control surfaces 72 to form a guide that aids in the attachment of the cleat 14 to the pedal 12.

The torsion springs 29 have their mounting or coiled portions mounted on support pin 28, with one end of each spring engaging a part of pedal body 22 and the other end of each spring engaging a tension adjustment mechanism 48 (indirectly engaging the rear clamping member 26). The springs 29 normally urge the clamping member 26 to rotate about the pivot pin 28 from a cleat releasing position to a cleat engaging or clamping position. In other words, the springs 29 normally maintain the clamping member 26 in cleat engaging position. The retaining forces of the springs 29 on the clamping member 26 is mainly controlled by changing the springs 29 with either weaker or stronger springs. Of course, the shape and the construction of the clamping member 26 can be modified to change the cleat retaining force if needed and/or desired. Thus, the clamping member 26 and/or the springs 29 can be easily exchanged to control the cleat retaining force of the pedal 12 or to replace a damaged part.

The cleat stop surface 23b is preferably disposed between the first plane $P_1$ and the second plane $P_2$. Moreover, the cleat stop surface 23b preferably extends perpendicularly between the first and second planes $P_1$ and $P_2$. Preferably the cleat stop surface 23b is located between the center rotation axis A and the front cleat engagement surface 50.

Figure 5:
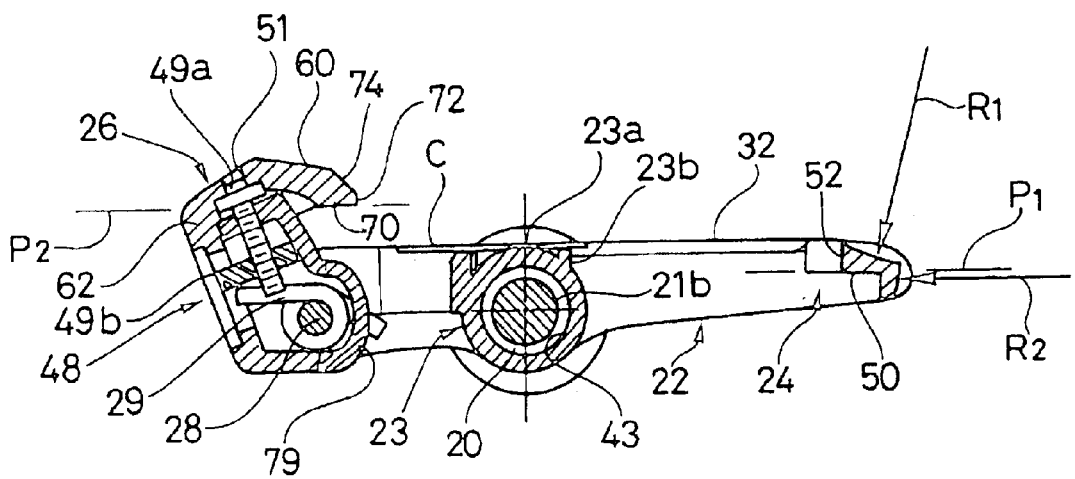
FIG. 5 is a cross-sectional view of the bicycle pedal illustrated in FIGS. 1–4, as seen along section line 5—5 of FIG. 3.
Figure 6:
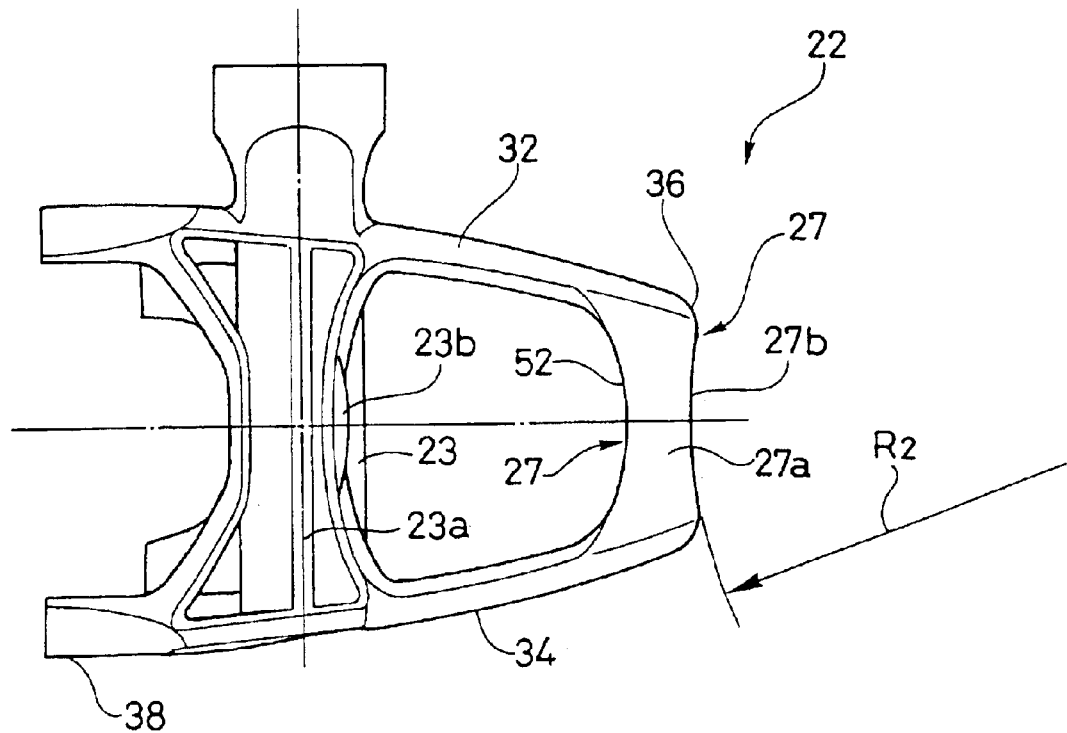
FIG. 6 is a top plan view of the pedal body of the bicycle pedal illustrated in FIGS. 1–5.
Figure 7:
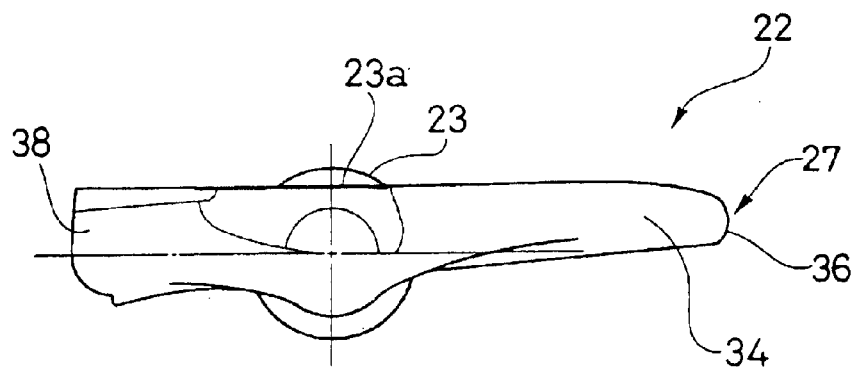
FIG. 7 is am outside elevational view of the pedal body illustrated in FIG. 6.
Figure 8:
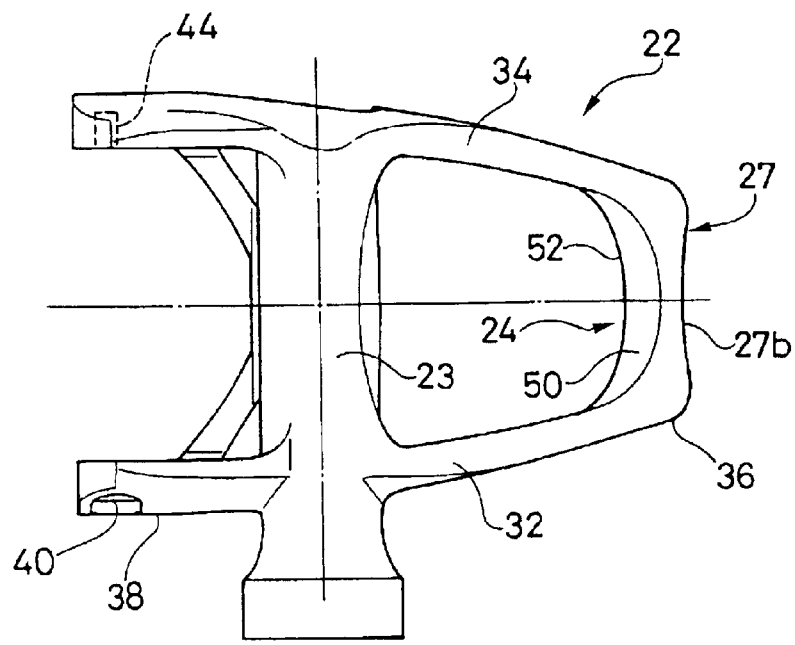
FIG. 8 is a bottom plan view of the pedal body illustrated in FIGS. 6 and 7.
Figure 9:
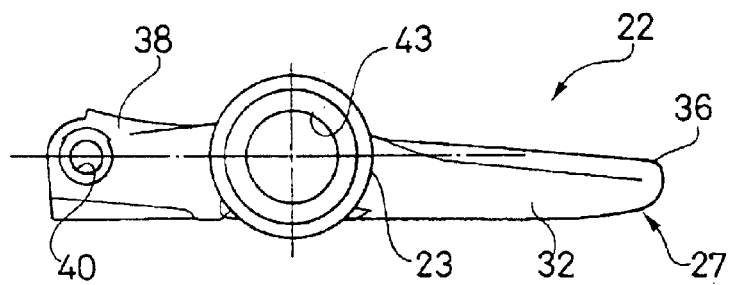
FIG. 9 is an inside elevational view of the pedal body illustrated in FIGS. 6–8.
Figure 10:
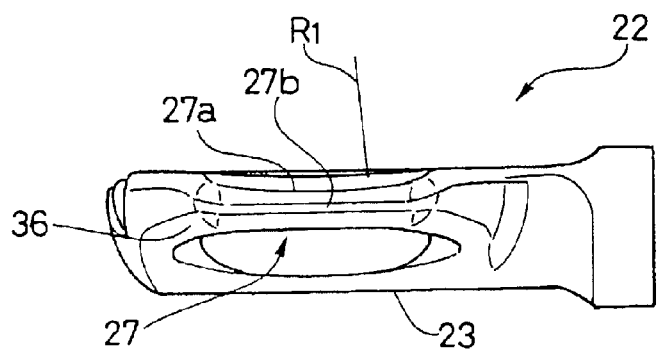
FIG. 10 is a front elevational view of the pedal body illustrated in FIGS. 6–9.
Figure 11:
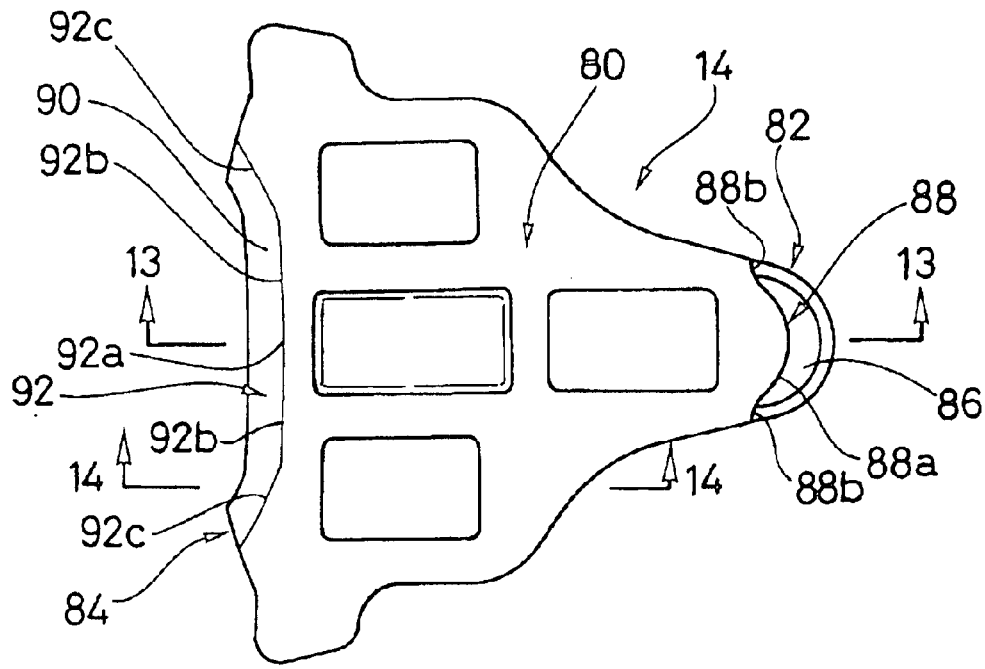
FIG. 11 is a top plan view of the cleat that is used with the of the bicycle pedal illustrated in FIGS. 1–5.
Figure 12:
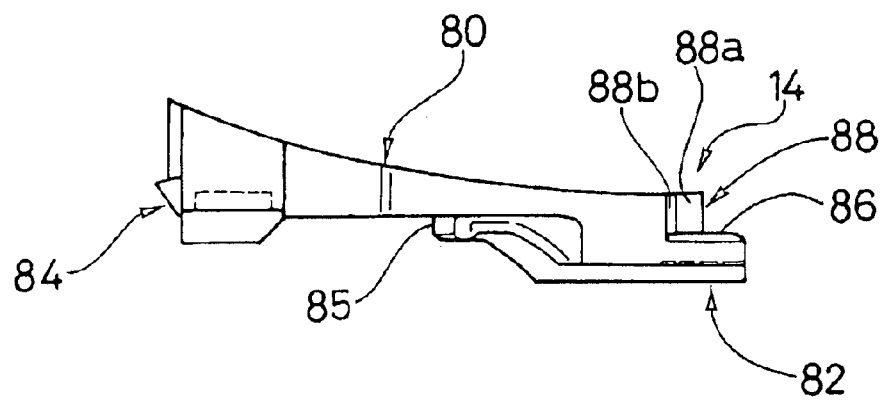
FIG. 12 is a side elevational view of the cleat illustrated in FIG. 11.
Figure 13:
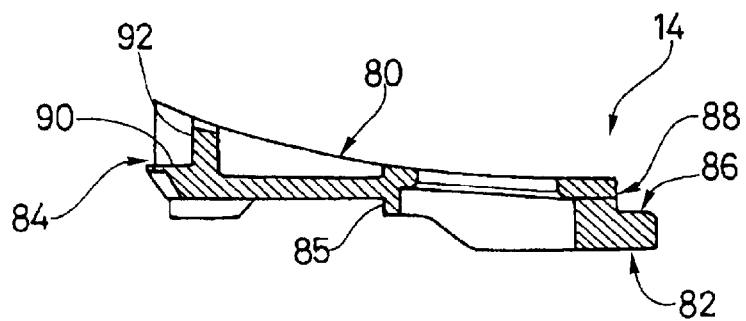
FIG. 13 is a cross-sectional view of the cleat illustrated in FIGS. 11 and 12, as seen along line 13—13 of FIG. 11.
Figure 14:
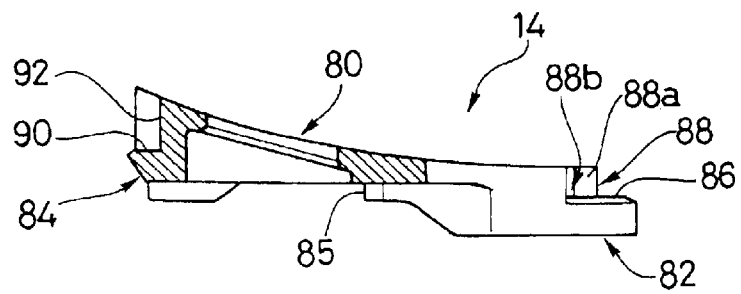
FIG. 14 is a cross-sectional view of the cleat illustrated in FIGS. 11–13, as seen along section line 14—14 of FIG. 11.
Figure 15:
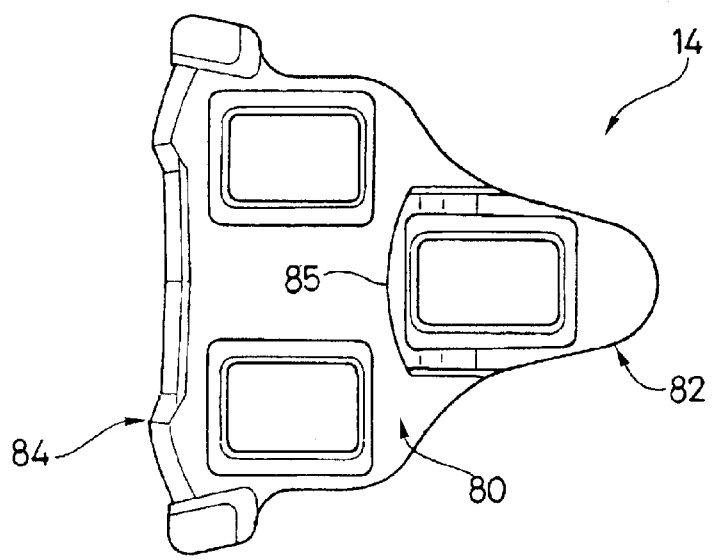
FIG. 15 is a bottom plan view of the cleat illustrated in FIGS. 11–14.

As best seen in FIG. 5, the tension adjustment mechanism 48 is mounted between the rear clamping member 26 and the springs 29 to adjust the biasing force of the springs 29 applied to the rear clamping member 26. The adjustment mechanism 48 basically includes an adjustment bolt 49a and an adjustment plate 49b. The adjustment bolt 49a is threaded into a threaded hole formed in the adjustment plate 49b. The head of the adjustment bolt 49a is step shaped to be received in a mating step shaped hole 51 of the rear clamping member 26. The adjustment plate 49b is a T-shaped plate. The adjustment plate 49b contacts the rear clamping member 26 to apply the biasing force of the springs 29 to the rear clamping member 26. The associated springs 29 are now adjustably placed under tension. This arrangement allows for easy assembly of the bicycle pedal 12. The tension adjustment mechanism 48 is relatively conventional, and thus, will not be discussed and/or illustrated in detail herein.

Preferably, a cover member 79 overlies the springs 29 and the tension adjustment mechanism 48. The cover member 79 prevents mud and other contaminates from clogging the operation of the tension adjustment mechanism 48 and/or the springs 29. Preferably, the cover member 79 is constructed of a light weight material such as plastic. The cover member 79 is formed to fit snuggly within the rear clamping member 26 and overlies the pivot pin 28 and the springs 29. An example of such a cover member is disclosed in U.S. Pat. No. 6,014,914, assigned to Shimano Inc. Thus, the cover member 79 will not be discussed and/or illustrated in detail herein.

A cleat receiving area is formed on one side of the pedal body 22 for receiving and supporting the cleat 14 thereon. More specifically, the cleat receiving area is defined by the space located between the front and rear clamping members 24 and 26 in which the cleat 14 is received. The front and rear clamping members 24 and 26 engage the cleat 14 to releasably couple the sole of the shoe 16 to the bicycle pedal 12. Specifically, the cleat 14 is engaged with the pedal 12 by pressing the cleat 14 into pedal 12 with a forward and downward motion. This releasably locks the cleat 14 to the pedal 12. The cleat 14 can be released from the pedal 12 by twisting the heel of the shoe to the outside of the pedal 12 as discussed below in more detail.

Referring to FIGS. 11–15, the bicycle shoe cleat 14 basically includes a center connecting portion 80, a first or front attachment portion 82 extending from one end of center connecting portion 80 and a second or rear attachment portion 84 extending from the other end of the center connecting portion 80. Preferably, the center connecting portion 80 and the attachment portions 82 and 84 are integrally formed together as a one-piece, unitary member, which is constructed from a suitable rigid material. The center connecting portion 80 has a plurality (three) of holes formed therein for receiving fasteners (not shown). Specifically, the cleat 14 is designed for use with three fasteners. The center connecting portion 80 has an upper sole side facing in a first direction for engaging the sole of the shoe 16 and a lower (bottom) pedal side facing in a second direction which is substantially opposite to the first direction. The center connecting portion 80 preferably has a rearwardly facing (second) cleat stop surface 85 disposed on the bottom pedal facing side of the connecting portion 80.

The cleat stop surface 85 is arranged and configured relative to the cleat stop surface 23b of the pedal body 22 such that the cleat stop surface 85 engages the cleat stop surface 23b after a predetermined amount of rearward movement of the cleat 14 relative to the pedal body 22 to prevent further relative movement between the cleat 14 and the pedal body 22 when the front and rear clamping members 24 and 26 are engaged with the front and rear attachment portions 82 and 84, respectively. In other words, the cleat stop surfaces 23b and 85 are configured to limit rearward movement of the cleat 14 relative to the pedal body 22 such that the cleat 14 is not inadvertently released from the pedal body 22 due to rearward relative movement of the cleat 14 relative to the pedal body 22. However, there is preferably a small gap that is normally located between the cleat stop surface 23b and the cleat stop surface 85, when the front and rear clamping members 24 and 26 are engaged with the front and rear attachment portions 82 and 84, respectively. The cleat stop surface 85 of the cleat 14 is normally longitudinally spaced about 0.5 millimeters from the cleat stop surface 23b when the front and rear clamping members 24 and 26 are engaged with the front and rear attachment portions 82 and 84, respectively.

During normal engagement between the pedal 12 and the cleat 14, the cleat 14 cannot move along the longitudinal axis B of the pedal body 22 without rotating the rear clamping member 26 against the biasing force of the springs 28. Accordingly, the cleat stop surfaces 23b and 85 allow for a predetermined amount of rearward movement of the cleat 14 relative to the pedal body 22 in the direction of the longitudinal axis B. In other words, the cleat stop surfaces 23b and 85 are oppositely curved surfaces that are configured and arranged such that they do not interfere with the normal releasing of the cleat 14 relative to the pedal 12. In other words, the curvature of the cleat stop surfaces 23b and 85 are such that the cleat 14 can freely pivot about a front disengagement pivot axis.

The front attachment portion 82 of the cleat 14 basically includes a front coupling surface 86 and a front cleat control surface 88. The front coupling surface 86 is selectively engageable with the front engagement surface 50 of the front clamping member 24. The front cleat control surface 88 cooperates with the front pedal control surface 52 to control movement of the cleat 14 relative to the pedal 12. Specifically, the front cleat control surface 88 is a transverse surface extending upwardly from the front coupling surface 86. Preferably the front cleat control surface 88 extends substantially perpendicular to the front coupling surface 86 and includes a central convex curved surface 88a and a pair of end surfaces 88b. The central convex surface 88a has a radius of curvature smaller than the radius of curvature of the concave surface of the front pedal control surface 52.

The rear attachment portion 84 of the cleat 14 basically includes a rear coupling surface 90 and a rear cleat control surface 92. The rear coupling surface 90 is selectively engageable with the rear engagement surface 70 of the rear clamping member 26. The rear cleat control surface 92 cooperates with the rear pedal control surface 72 to control movement of the cleat 14 relative to the pedal 12. Specifically, the rear cleat control surface 92 is a transverse surface extending upwardly from the rear coupling surface 90. Preferably the rear cleat control surface 92 is an inclined surface forming an angle of about ninety degrees with the rear coupling surface 90 and includes a central convex curved surface 92a, a pair of straight side surfaces 92b and a pair of inclined edge surfaces 92c.

Second Embodiment

Figure 27:
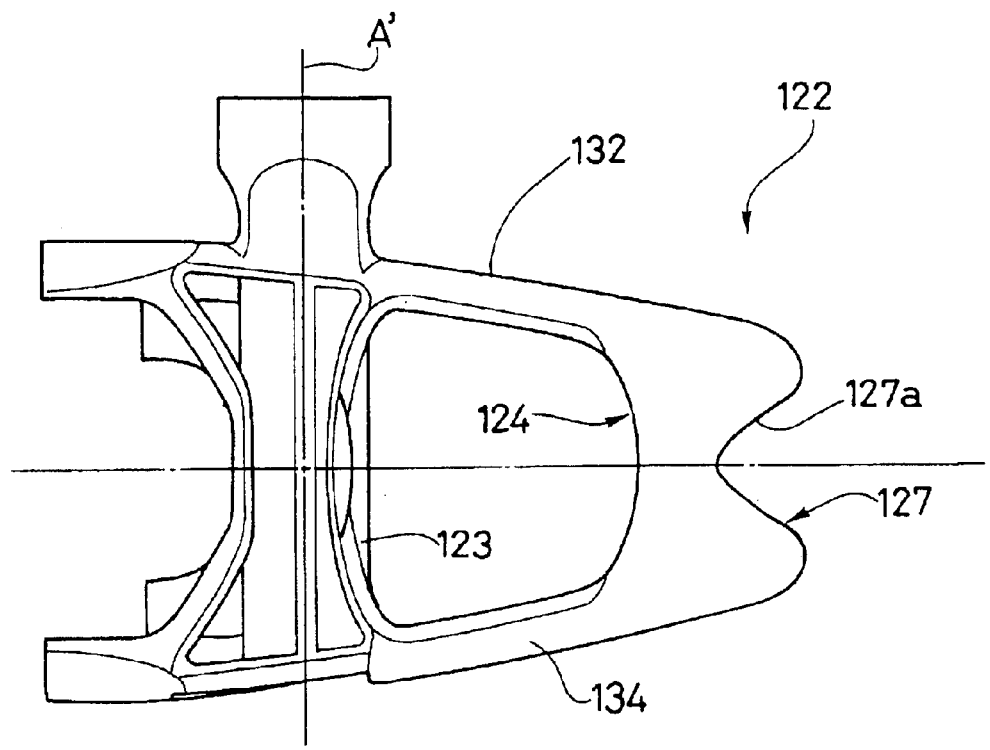
FIG. 27 is a top plan view of a pedal body in accordance with a second embodiment of the present invention.
Figure 28:
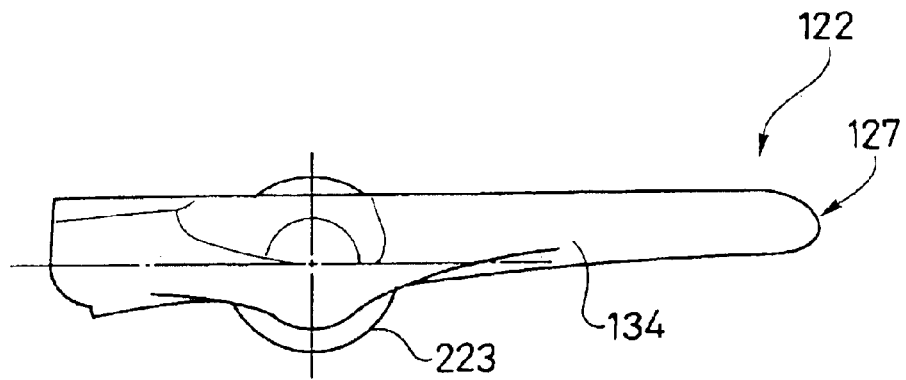
FIG. 28 is a side elevational view of the pedal body illustrated in FIG. 27.

Referring now to FIGS. 27 and 28, a bicycle pedal body 122 is illustrated in accordance with a second embodiment of the present invention. The bicycle pedal body 122 of this second embodiment is configured to be used in the bicycle pedal assembly 10 of the first embodiment. In other words, the bicycle pedal body 22 of the bicycle pedal assembly 10 of the first embodiment can be replaced with the bicycle pedal body 122 of this second embodiment. Thus, the shaft or spindle 20, the rear clamping member 26 and the tension adjustment mechanism 48 are installed on the bicycle pedal body 122 in the same manner as discussed above in connection with the bicycle pedal body 22 of the bicycle pedal assembly 10 of the first embodiment. Moreover, the bicycle pedal body 122 cooperates with the cleat 14 in the same manner as discussed above.

The only difference between the bicycle pedal body 122 of this second embodiment and the bicycle pedal body 22 of the first embodiment is that the front end of the pedal body 122. In view of the similarities between this second embodiment and the first embodiment, the following description will focus mainly on the difference. However, it will be apparent to those skilled in the art from this disclosure that most of the descriptions of the first embodiment also apply to this second embodiment.

The front end of the pedal body 122 is configured and arranged to include a sole guide portion 127 that assists in rotating the pedal body 122 about the pedal shaft 20. The sole guide portion 127 is formed by a V-shaped sole receiving recess 127a located in a forwardly facing tip surface. The V-shaped sole receiving recess 127a performs the function of both of the concaved sole receiving recesses of the first embodiment. The term "V-shaped sole receiving recess" as used herein should be construed to include a "U-shaped sole receiving recess".

The pedal body 122 is substantially identical to pedal body 22 of the first embodiment and basically includes a front clamping member 124 (identical to the front clamping member 27 discussed above), a center tubular portion 123, an inner side portion 132 and an outer side portion 134. The front clamping member 124 is fixedly coupled to the pedal body 122, while the rear clamping member 26 is pivotally coupled to the pedal body 122. More specifically, the front clamping member 124 is preferably a non-movable member that is integrally formed with the pedal body 122. The center tubular portion 123 receives the pedal shaft 20 for rotation about a center longitudinal axis A', while the side portions 132 and 134 pivotally support the rear clamping member 26.

Third Embodiment

Figure 29:
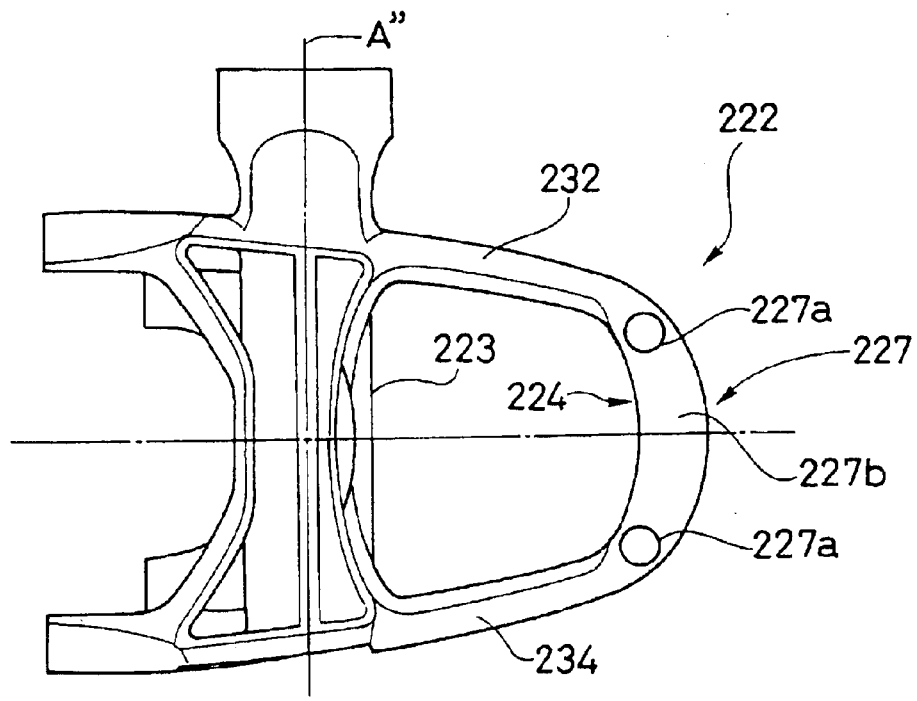
FIG. 29 is a top plan view of a pedal body in accordance with a third embodiment of the present invention.
Figure 30:
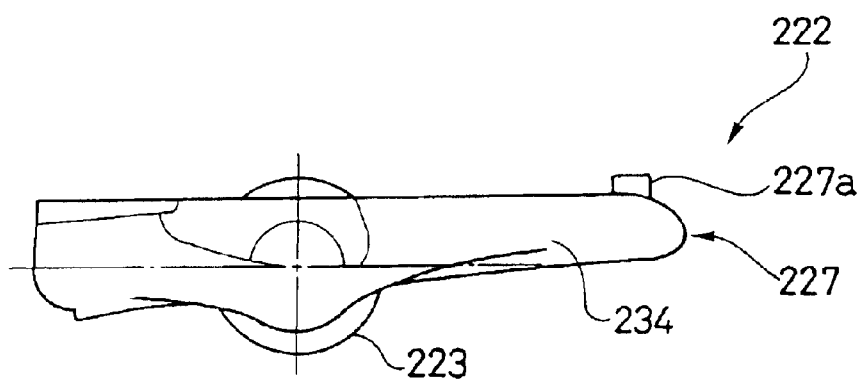
FIG. 30 is a side elevational view of the pedal body illustrated in FIG. 29.

Referring now to FIGS. 29 and 30, a bicycle pedal body 222 is illustrated in accordance with a third embodiment of the present invention. The bicycle pedal body 222 of this third embodiment is configured to be used in the bicycle pedal assembly 10 of the first embodiment. In other words, the bicycle pedal body 22 of the bicycle pedal assembly 10 of the first embodiment can be replaced with the bicycle pedal body 222 of this third embodiment. Thus, the shaft or spindle 20, the rear clamping member 26 and the tension adjustment mechanism 48 are installed on the bicycle pedal body 222 in the same manner as discussed above in connection with the bicycle pedal body 22 of the bicycle pedal assembly 10 of the first embodiment. Moreover, the bicycle pedal body 222 cooperates with the cleat 14 in the same manner as discussed above.

The only difference between the bicycle pedal body 222 of this third embodiment and the bicycle pedal body 22 of the first embodiment is that the front end of the pedal body 222. In view of the similarities between this third embodiment and the first embodiment, the following description will focus mainly on the difference. However, it will be apparent to those skilled in the art from this disclosure that most of the descriptions of the first embodiment also apply to this third embodiment.

The front end of the pedal body 222 is configured and arranged to include a sole guide portion 227 that assists in rotating the pedal body 222 about the pedal shaft 20. The sole guide portion 227 is formed by a pair of projections 227a that define a concaved sole receiving recess 227b therebetween. The concaved sole receiving recess 227b is located at the forwardly facing tip surface of the pedal body 222.

The pedal body 222 is substantially identical to pedal body 22 of the first embodiment and basically includes a front clamping member 224 (identical to the front clamping member 24 discussed above), a center tubular portion 223, an inner side portion 232 and an outer side portion 234. The front clamping member 224 is fixedly coupled to the pedal body 222, while the rear clamping member 26 is pivotally coupled to the pedal body 222. More specifically, the front clamping member 224 is preferably a non-movable member that is integrally formed with the pedal body 222. The center tubular portion 223 receives the pedal shaft 20 for rotation about the center longitudinal axis A", while the side portions 232 and 234 pivotally support the rear clamping member 26.

Fourth Embodiment

Figure 31:
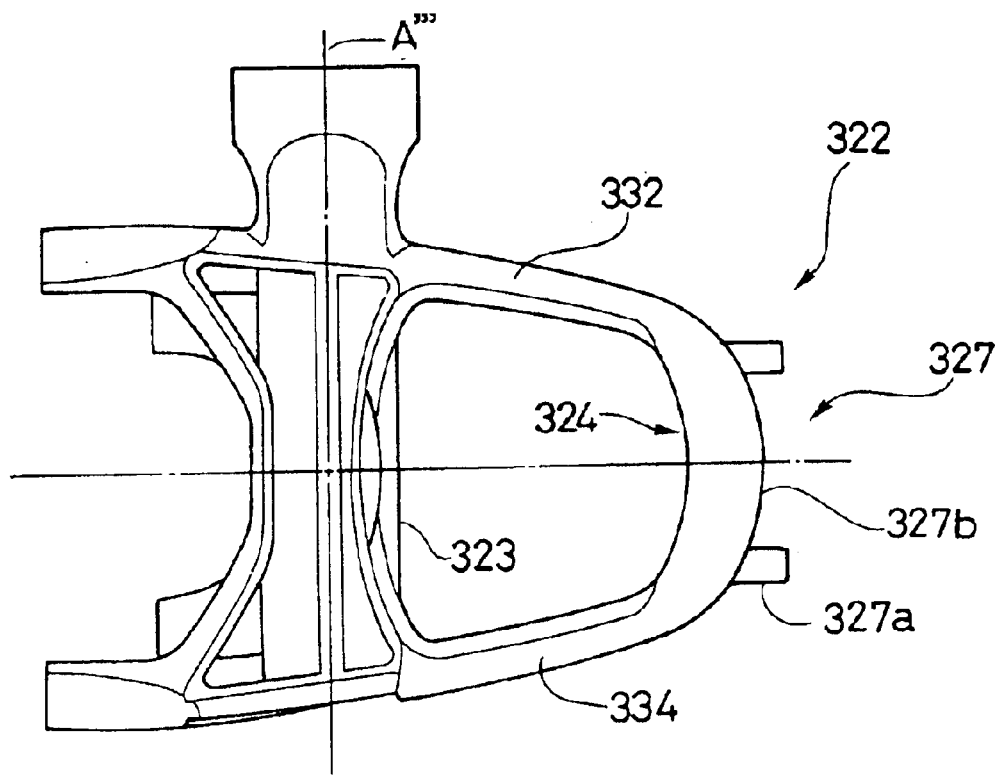
FIG. 31 is a top plan view of a pedal body in accordance with a fourth embodiment of the present invention.
Figure 32:
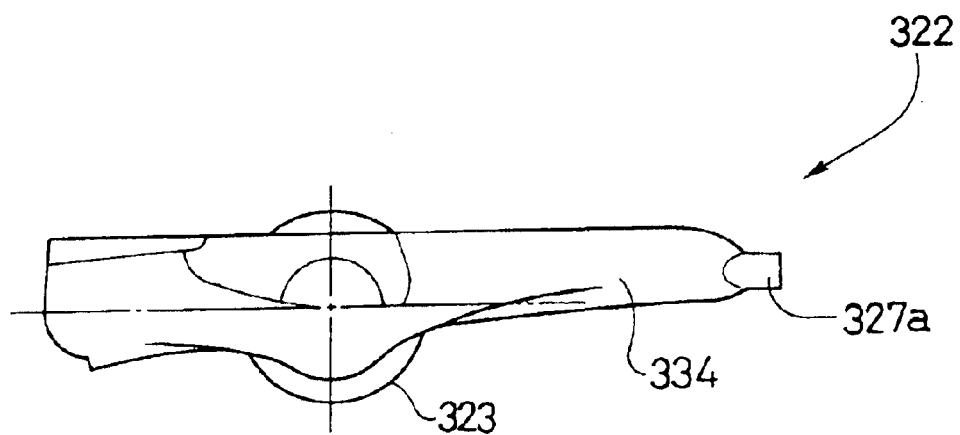
FIG. 32 is a side elevational view of the pedal body illustrated in FIG. 31.

Referring now to FIGS. 31 and 32, a bicycle pedal body 322 is illustrated in accordance with a fourth embodiment of the present invention. The bicycle pedal body 322 of this fourth embodiment is configured to be used in the bicycle pedal assembly 10 of the first embodiment. In other words, the bicycle pedal body 22 of the bicycle pedal assembly 10 of the first embodiment can be replaced with the bicycle pedal body 322 of this fourth embodiment. Thus, the shaft or spindle 20, the rear clamping member 26 and the tension adjustment mechanism 48 are installed on the bicycle pedal body 322 in the same manner as discussed above in connection with the bicycle pedal body 22 of the bicycle pedal assembly 10 of the first embodiment. Moreover, the bicycle pedal body 322 cooperates with the cleat 14 in the same manner as discussed above.

The only difference between the bicycle pedal body 322 of this fourth embodiment and the bicycle pedal body 22 of the first embodiment is that the front end of the pedal body 322. In view of the similarities between this fourth embodiment and the first embodiment, the following description will focus mainly on the difference. However, it will be apparent to those skilled in the art from this disclosure that most of the descriptions of the first embodiment also apply to this fourth embodiment.

The front end of the pedal body 322 is configured and arranged to include a sole guide portion 327 that assists in rotating the pedal body 322 about the pedal shaft 20. The sole guide portion 327 is formed by a pair of projections 327a that define a concaved sole receiving recess 327b at the forwardly facing tip surface of the pedal body 322.

The pedal body 322 is substantially identical to pedal body 22 of the first embodiment and basically includes a front clamping member 324 (identical to the front clamping member 24 discussed above), a center tubular portion 323, an inner side portion 332 and an outer side portion 334. The front clamping member 324 is fixedly coupled to the pedal body 322, while the rear clamping member 26 is pivotally coupled to the pedal body 322. More specifically, the front clamping member 324 is preferably a non-movable member that is integrally formed with the pedal body 322. The center tubular portion 323 receives the pedal shaft 20 for rotation about the center longitudinal axis A'", while the side portions 332 and 334 pivotally support the rear clamping member 26.

As used herein to describe the prior three embodiments and claim the present invention, the following directional terms "forward, rearward, above, upward, downward, bottom, vertical, horizontal, below and transverse" as well as any other similar directional terms refer to those directions of a bicycle equipped with a pedal of the present invention and when the pedal is horizontally oriented relative to the ground. Accordingly, these terms, as utilized to describe the present invention should be interpreted relative to a bicycle equipped with a pedal of the present invention.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle pedal comprising:
   a pedal shaft having a first end adapted to be coupled to a bicycle crank and a second end with a center rotation axis extending between said first and second ends;
   a pedal body rotatably coupled to said second end of said pedal shaft about said center rotation axis of said pedal shaft, said pedal body having a front end and a rear end with said front end of said pedal body being configured and arranged to include a sole guide portion that assists in rotating said pedal body about said pedal shaft, said sole guide portion including an upwardly facing first concaved sole receiving recess having a central axis lying in a plane that is substantially perpendicular to said center rotation axis of said pedal shaft; and
   a cleat engagement mechanism coupled to an upper surface of said pedal body and including a front clamping member with a downwardly facing front cleat engagement surface, said first concaved sole receiving recess being located above the front cleat engagement surface.

2. The bicycle pedal according to claim 1, wherein said concaved sole receiving recess is located on said upper surface of said pedal body and adjacent a forwardly facing tip surface of said pedal body.

3. A bicycle pedal comprising:
   a pedal shaft having a first end adapted to be coupled to a bicycle crank and a second end with a center rotation axis extending between said first and second ends;
   a pedal body rotatably coupled to said second end of said pedal shaft about said center rotation axis of said pedal shaft, said pedal body having a front end and a rear end with said front end of said pedal body being configured and arranged to include a sole guide portion that assists in rotating said pedal body about said pedal shaft, said sole guide portion including a concaved sole receiving recess, said concaved sole receiving recess being located in a forwardly facing tip surface, said concaved sole receiving recess having a central axis lying in a plane that is substantially perpendicular to said center rotation axis of said pedal shaft; and
   a cleat engagement mechanism coupled to an upper surface of said pedal body.

4. The bicycle pedal according to claim 3, wherein said concaved sole receiving recess of said forwardly facing tip surface of said pedal body has an V-shape configuration.

5. A bicycle pedal comprising:
   a pedal shaft having a first end adapted to be coupled to a bicycle crank and a second end with a center rotation axis extending between said first and second ends;
   a pedal body rotatably coupled to said second end of said pedal shaft about said center rotation axis of said pedal shaft, said pedal body having a front end and a rear end with said front end of said pedal body being configured and arranged to include a sole guide portion that assists in rotating said pedal body about said pedal shaft, said sole guide portion including a first concaved sole receiving recess; and
   a cleat engagement mechanism coupled to an upper surface of said pedal body,
   said first concaved sole receiving recess being located on said upper surface of said pedal body and adjacent a forwardly facing tip surface of said pedal body, said sole guide portion further including a second concaved sole receiving recess located in said forwardly facing tip surface of said pedal body, said second concaved sole receiving recess having a central axis lying in a plane that is substantially perpendicular to said center rotation axis of said pedal shaft.

6. The bicycle pedal according to claim 5, wherein said cleat engagement mechanism includes a front clamping member coupled to said front end of said pedal body, and a rear clamping member movably coupled to said rear end of said pedal body.

7. The bicycle pedal according to claim 6, wherein said front clamping member includes a downwardly facing front cleat engagement surface disposed in a first plane, and
   said rear clamping member includes a downwardly facing rear cleat engagement surface disposed in a second plane that is offset from said first plane of said front cleat engagement surface.

8. The bicycle pedal according to claim 7, wherein said front clamping member includes a rearwardly facing front pedal control surface, and
   said rear clamping member includes a forwardly facing rear pedal control surface.

9. The bicycle pedal according to claim 7, wherein said front and rear cleat engagement surfaces are substantially parallel.

10. The bicycle pedal according to claim 9, wherein said first plane of said front cleat engagement surface is closer to said center rotation axis than said second plane of said rear cleat engagement surface as measured in a direction perpendicular to said first and second planes.

11. The bicycle pedal according to claim 6, wherein said front clamping member is non-movably coupled to said pedal body.

12. The bicycle pedal according to claim 6, wherein said front clamping member is integrally formed with said pedal body as a one-piece, unitary member.

13. The bicycle pedal assembly according to claim 6, wherein
   said rear clamping member is pivotally coupled to said pedal body.

14. The bicycle pedal according to claim 6, wherein said rear clamping member is normally biased toward a clamping position by a biasing member arranged between said pedal body and said rear clamping member.

15. The bicycle pedal according to claim 14, wherein said rear clamping member and said biasing member are mounted on a support pin that is coupled to said pedal body.

* * * * *